(12) United States Patent
Liou

(10) Patent No.: US 7,470,087 B2
(45) Date of Patent: Dec. 30, 2008

(54) WAVE-DISSIPATING BLOCK

(75) Inventor: Bai-Chieng Liou, 3F, No. 3, Lane 105, Lisin St., Fongshan City, Kaohsiung Hsien (TW)

(73) Assignees: Bai-Chieng Liou, Fongshan (TW); Yi-Tzu Chong, Kaohsiung Hsien (TW); Yuh-Shu Yen, Fongshan (TW); Kuo-Liang Chiang, Kaohsiung (TW)

( * ) Notice: Subject to any disclaimer, the term of this patent is extended or adjusted under 35 U.S.C. 154(b) by 124 days.

(21) Appl. No.: 11/656,095

(22) Filed: Jan. 22, 2007

(65) Prior Publication Data

US 2008/0175667 A1 Jul. 24, 2008

(51) Int. Cl.
*E02B 9/08* (2006.01)
(52) U.S. Cl. .............................. 405/76; 405/22; 405/25
(58) Field of Classification Search ................... 405/22, 405/25, 31, 75–58
See application file for complete search history.

(56) References Cited

U.S. PATENT DOCUMENTS 4,189,918 A * 2/1980 Moody et al. ................. 405/76
4,564,312 A * 1/1986 Munoz Saiz ................. 405/76
2005/0207844 A1* 9/2005 Boccotti ....................... 405/21
2006/0104719 A1* 5/2006 Fainman et al. .............. 405/21

FOREIGN PATENT DOCUMENTS

| GB | 2080437 A | | 2/1982 |
|---|---|---|---|
| GB | 2283265 A | | 5/1995 |
| JP | 61106810 A | | 5/1986 |
| JP | 06081328 A | * | 3/1994 |

* cited by examiner

*Primary Examiner*—Frederick L Lagman
(74) *Attorney, Agent, or Firm*—Alan Kamrath; Kamrath & Associates PA

(57) ABSTRACT

A wave-dissipating block has a body and a turbine generator assembly. The body has an airway and an overhang. The airway is formed in the body, is substantially J-shape and has an opening communicating with a front of the body and substantially facing upward. The overhang hangs over the airway and has an air window formed in the overhang and communicating with the airway. The turbine generator assembly has a housing mounted on the overhang and has an air channel communicating with the air window, a turbine fan mounted in the air channel and a generator connected to the turbinate fan. Waves can directly pour into the airway with minimized loss of kinetic energy and forms a water column in the airway to effectively suck or push air to passing through the air channel to rotate the turbinate fan to drive the generator to efficiently generate electric power.

10 Claims, 10 Drawing Sheets

WAVE-DISSIPATING BLOCK

BACKGROUND OF THE INVENTION

1. Field of the Invention

The present invention relates to a wave-dissipating block, and more particularly to a wave-dissipating block for constructing a breakwater and efficiently converting wave energy into electric power.

2. Description of Related Art

Enormous energy is contained in the ocean in types of ocean currents, tides and waves, so how to efficiently utilize the energy contained in the ocean is an important subject. Currently, there are several different types of apparatus have been developed to convert potential kinetic energy contained in the waves into electric power.

With reference to FIGS. 8 and 9, a conventional apparatus that utilizes waves for generating electric power is equipped in an offshore ship and has a body (90). The body (90) is made of metal, is hollow and has an upper component, a lower component, an air chamber, an inlet channel (91), an outlet channel (92) and an activating chamber (93) and has a turbine generator (94).

The air chamber is formed in the lower component of the body (90) and is divided into two an inlet minor air chamber (95) and an outlet minor air chamber (96). The inlet and outlet minor air chambers (95, 96) both have an open bottom (951, 961) and atop opening (952, 962). The open bottom (951, 961) is submerged such that surface of the sea is received in the minor air chamber (95, 96) and waves are allowed to rise and fall in the minor air chamber (95, 96).

With further reference to FIG. 9, when waves in the minor air chamber (95, 96) rise, air in the minor air chamber (95, 96) is forced to pass out of the top opening (952, 962) of the minor air chamber (95, 96) because air pressure in the minor air chamber (95, 96) is increased.

With further reference to FIG. 8, when waves in the minor air chamber (95, 96) fall, air outside the minor air chamber (95, 96) is sucked to pass into the minor air chamber (95, 96) because air pressure in the minor air chamber (95, 96) is decreased.

The inlet channel (91) is formed in the upper component of the body (90), communicates with the top opening (952) of the inlet minor air chamber (95) and has an inlet valve (911). The inlet valve (911) communicates with outside and is one-way for air outside the body (90) to pass into the inlet channel (91). The outlet channel (92) is formed in the upper component of the body (90), communicates with the top opening (962) of the out let minor air chamber (95) and has an outlet valve (921). The outlet valve (921) communicates with outside and is one-way for discharging air inside the body (90).

The activating chamber (93) is formed in the upper component of the body (90) between the inlet channel (91) and the outlet channel (92) and has an air inlet (931) and an air outlet (932). The air inlet (931) communicates with the inlet channel (91). The air outlet (932) communicates with the outlet channel (92). Thus, air in the inlet channel (91) is allowed to pass into the outlet channel (92) through the activating chamber (93).

The turbine generator (94) has a turbine fan (941) and a generator (94). The turbine fan (941) is mounted in the air inlet (931) of the activating chamber (93) to be driven by air flowing through the air inlet (931). The generator (94) is mounted in the activating chamber (93) and is connected to and driven by the turbine fan (941) to convert kinetic energy into electric power.

When waves in the minor air chambers (95, 96) rise, the inlet valve (911) is closed and the outlet valve (921) is open, such that air in the minor air chambers (95, 96) is force to pass out of the outlet valve (921), wherein air in the inlet minor air chamber (95) passes through the activating chamber (93) to rotate to the turbine fan (941) to drive the generator (942) to generate electric power.

When waves in the minor air chambers (95, 96) fall, the inlet valve (911) is open and the outlet valve (921) is closed, such that air outside the body (90) is sucked into the minor chamber (95, 96) through the inlet valve (911), wherein part of the air passes through the activating chamber (93) to rotate to the turbine fan (941) to drive the generator (942) to generate electric power.

Because the waves never stop rising and falling, the generator (942) operates at all times to convert kinetic energy contained in the waves into electric power. Substantially, kinetic energy contained in the waves is transmitted along the surface of the sea. However, the open bottoms (951, 961) of the minor air chambers (95, 96) are formed to face downward, such that crests and troughs of the waves are easy to be blocked and dissipated by the body (90) and are hard to completely pass into the minor air chambers (95, 96) through the open bottoms (951, 961). Thus, a drop height of the waves in the minor air chambers (95, 96) is inefficient so that the turbine fan (941) can not be effectively rotated. Accordingly, the generator (942) is unable to efficiently generate electric power.

Additionally, the body (90) made of metal frequently contacts with seawater and is easily rusted.

With reference to FIG. 10, another conventional apparatus that utilizes waves for generating electric power is built on an inshore cliff and has a body (80), a shelter (81) and a turbine generator (82). The body (80) is mounted on the cliff, is hollow and has an outer wall, an open bottom (801) and an open top (802). The open bottom (801) is hung in the air above surface of the sea in default condition. The shelter (81) is mounted on the outer wall of the body (80), extends downward to submerge into the sea and forms an air chamber (811) between the shelter (81) and the cliff under the body (80). When crests of waves arrive in the air chamber (811), air in the air chamber (811) is forced into the body (80) through the open bottom (801) and passes out of the open top (802).

The turbine generator (82) is mounted in the open top (802) of the body (80) and has a turbine fan (821) and a generator (822). The turbine fan (821) is mounted in the open top (802) of the body (80) and is rotated by the air passing through the open top (802). The generator (822) is connected and driven by the turbine fan (821) to generate electric power.

Likewise, due to nonstop waves, the generator (822) operates at all times to generate electric power. However, the open bottom (801) of the body (10) is also formed to face downward, so that wave crests are blocked and dissipated by the shelter (81) before arriving in the air chamber (811). Accordingly, air in the air chamber (811) and the body (80) can not be effectively forced to rotate the turbine fan (821) to make the generator (822) inefficient to generate electric power.

With reference to FIG. 11, an another apparatus that utilizes waves for generating electric power is also built on an inshore cliff and has a body (70) and a turbine generator (71). The body (70) has a front, a rear, a top, a bottom, an air chamber (702), a wave inlet (701) and an air outlet (703). The air chamber (702) is formed in the body (70). The wave inlet (701) is formed in the front of the body (70) near the bottom of the body (70) and is located under surface of the sea such that waves can arrive in the air chamber (702) through the wave inlet (701) to forced air in the air chamber (702) upward.

The air outlet (703) is formed in the rear of the body (70) near the top of the body (70) and is located above the surface of the sea. Rising air pushed by the waves in the air chamber (702) is finally forced to pass out of the air outlet (703).

The turbine generator (71) is mounted in the air outlet (703) of the body (70) and has a turbine fan (711) and a generator (712). The turbine (711) is mounted in the air outlet (703) of the body (70) to be rotated by the air passing through the air outlet (703). The generator (712) is connected to and is driven by the turbine fan (711) to generate electric power.

The nonstop waves continuously push the air in the air chamber (702) to rotate the turbine fan (711), such that the generator (712) is capable of generating electric power at all times. Although the wave inlet (701) is formed toward front, wave crests are still blocked and dissipated by the front of the body (70) above the wave inlet (701). Thus, most kinetic energy contain in the wave crests is still can not be transmitted into the air chamber (702). Consequently, air in the air chamber (702) can not be effectively push upward and the generator (712) is unable to efficiently generating electric power.

Therefore, the invention provides a bolt for spectacles to mitigate or obviate the aforementioned problems.

SUMMARY OF THE INVENTION

The primary objective of the present invention is to provide a wave-dissipating block mitigate the aforementioned problems of the conventional apparatuses to efficiently utilize kinetic energy contained in waves.

The wave-dissipating block has a body and a turbine generator assembly. The body has a front, a top, an airway and an overhang. The airway is formed in the body, is substantially J-shape and has a curved part and a longitudinal part. The curved part has an opening communicating with the front of the body and substantially facing upward. Thus, waves are easy to pour into the airway though the opening facing upward and avoid to be blocked or dissipated by other component of the body. So, the waves can directly pour into the airway with minimized loss of kinetic energy to forms a higher water column in the longitudinal part of the airway. When wave crests and wave troughs consecutively arrive in the opening, the water column rises or falls in the longitudinal part of the airway, air is respectively sucked into or pushed out of the airway.

The overhang is formed on the top of the body, hangs over the airway between the side walls of the airway and has a bottom, a pendent shelter and an air window. The pendent shelter is formed on and protrudes down from the bottom of the overhang. The air window is formed in the overhang and communicates with outside and the longitudinal part of the airway. When the water column rises or falls in the longitudinal part of the airway, air is respectively sucked into or pushed out of the airway through the air window.

The turbine generator assembly has a housing, a turbine fan and a generator. The housing is mounted on the overhang and has an air channel. The air channel is formed through the housing and communicates with the air window in the overhang for air to pass through to be sucked or pushed out of the airway. The turbine fan is mounted rotatably in air channel and is rotated by the air passing through the air channel. The generator is connected to and driven by the turbine fan to generate electric power. Because waves can pour into the airway with least loss of kinetic energy, the water column in the airway forms an enough drop height between a uppermost point and a lowest point to effectively suck or push air to passing through the air channel. Thus, the turbinate fan can be effectively rotated and the generator can efficiently generate electric power at all times.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
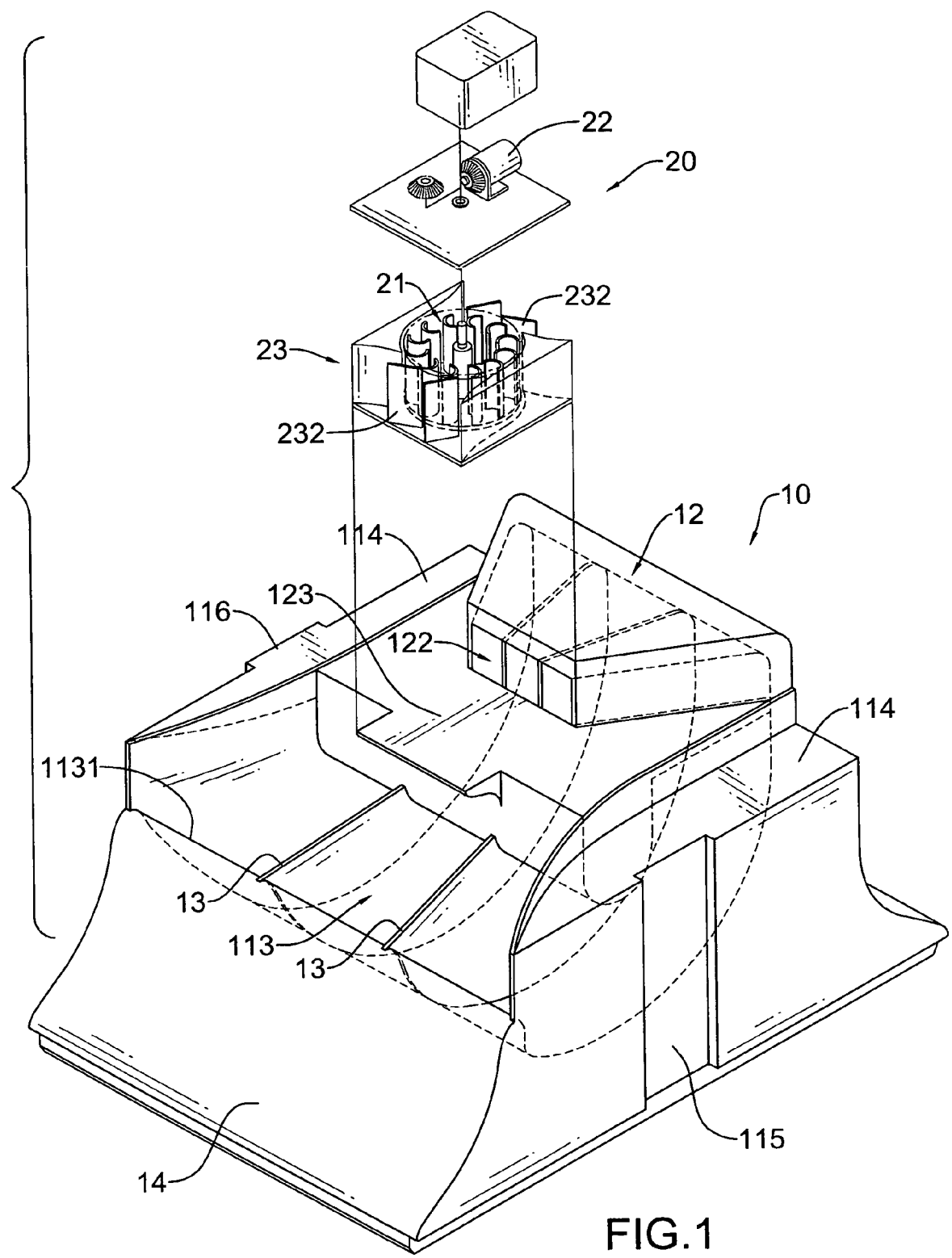
FIG. 1 is an exploded perspective view of a wave-dissipating block in accordance with the present invention.
Figure 2:
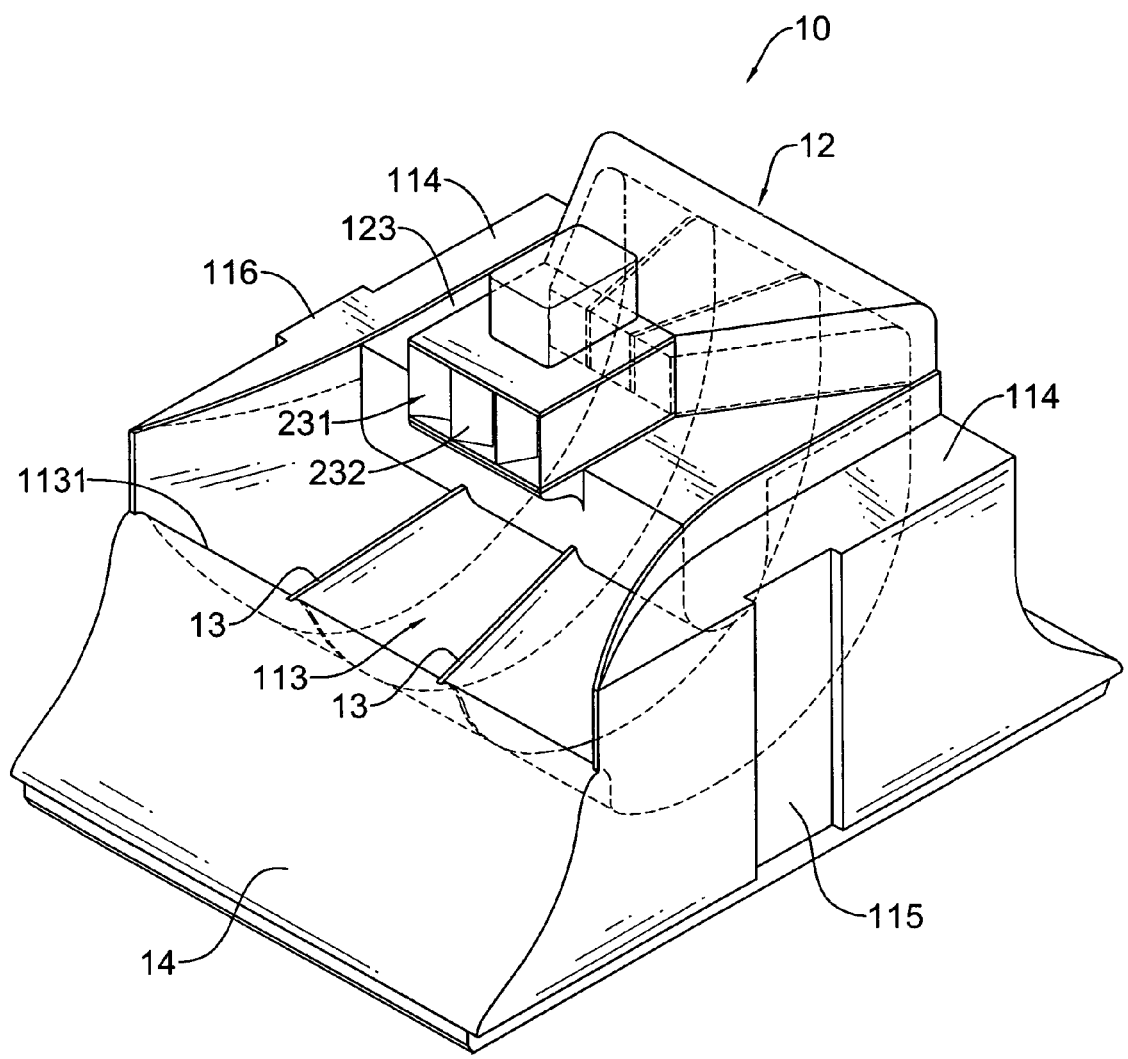
FIG. 2 is a perspective view of the wave-dissipating block in FIG. 1.

With reference to FIGS. 1 and 2, a wave-dissipating block in accordance with the present invention comprises a body (10) and a turbine generator assembly (20).

Figure 3:
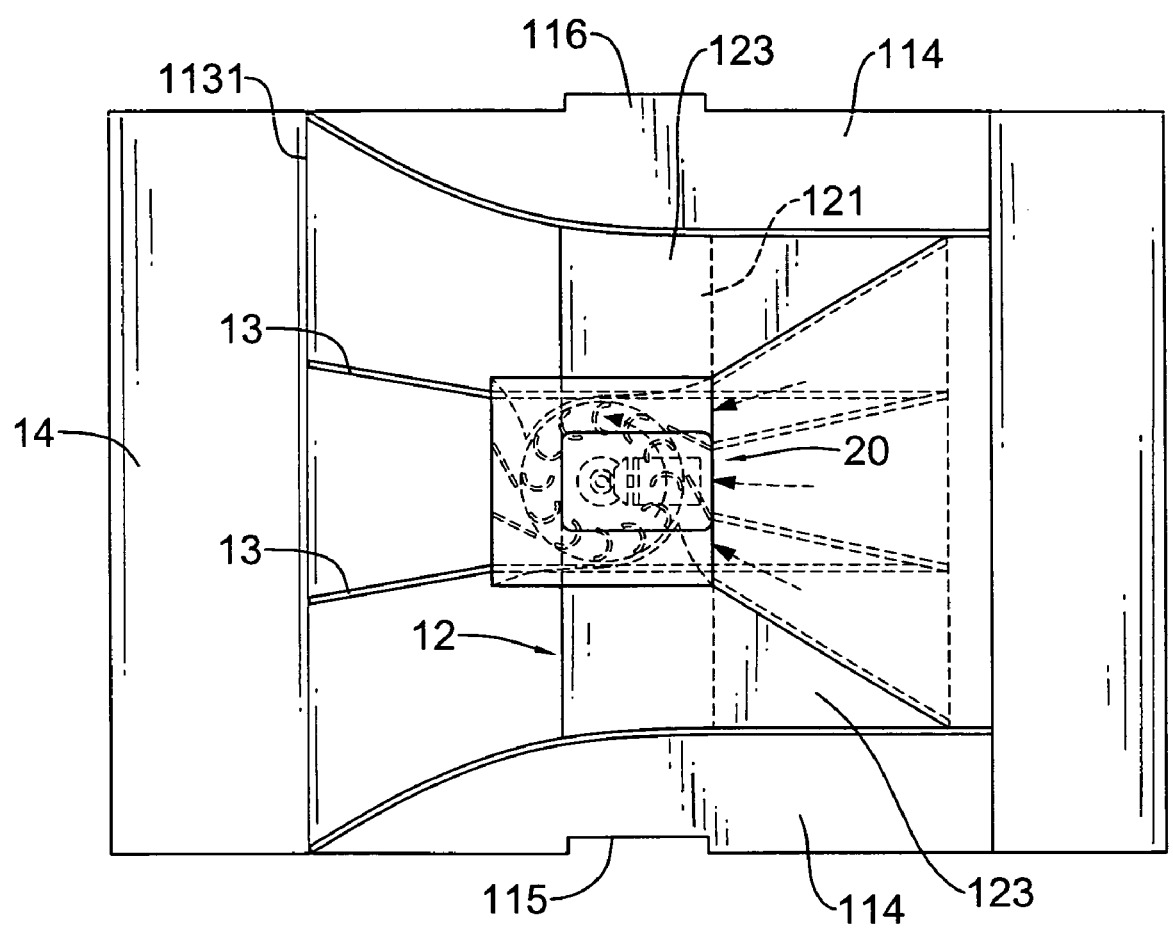
FIG. 3 is an operational top view of the wave-dissipating block in FIG. 1 with air being pushed to rotate a turbine fan.
Figure 4:
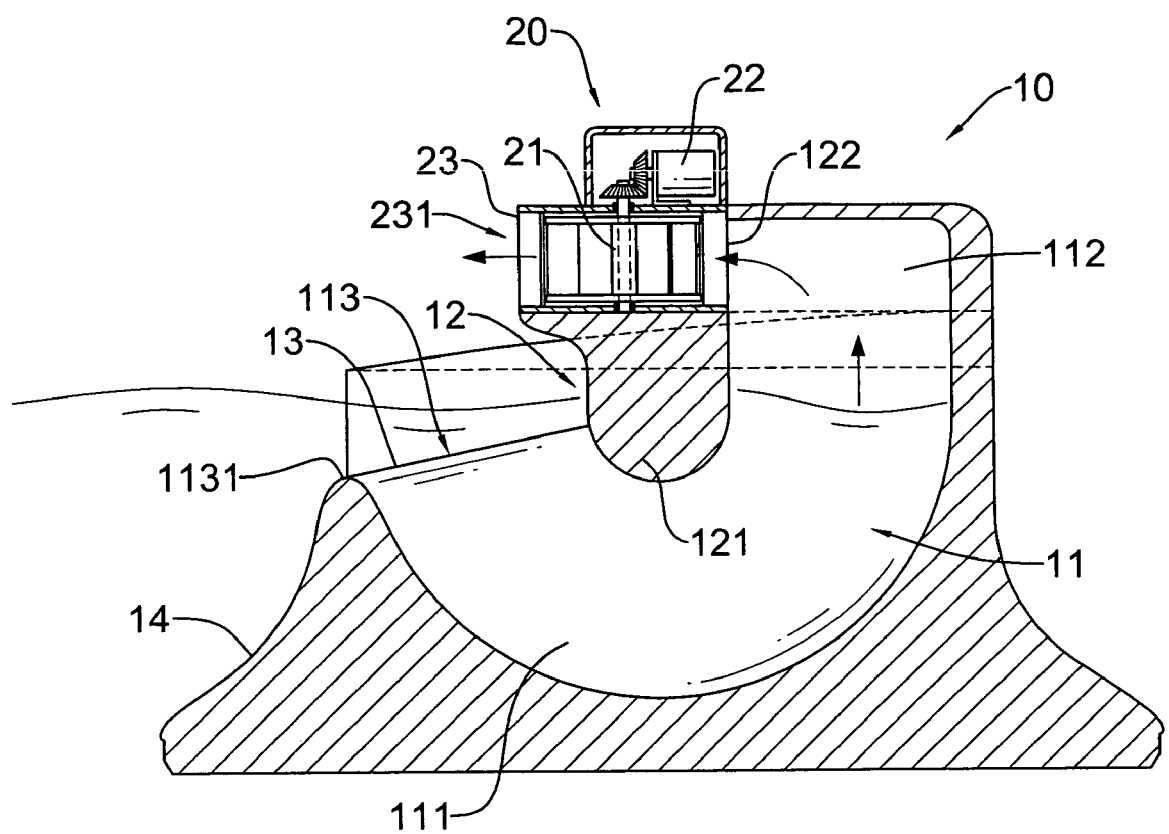
FIG. 4 is an operational side view in partial section of the wave-dissipating block in FIG. 1 with air being pushed out of an airway in a body of the wave-dissipating block.

With further reference to FIGS. 3 and 4, the body (10) is made of concrete and has a front, a rear, a top, a bottom, two sides, an airway (11), an overhang (12), multiple partition panels (13), a guide surface (14), two spillways (114), a connecting recess (115) and a connecting protrusion (116). The body (10) is made of concrete to prevent from being rusted by seawater.

The airway (11) is formed in the body (10), is substantially J-shape and has two side walls, a curved part (111) and a longitudinal part (112). The curved part (111) has a proximal end, a distal end and an opening (113) and may be gradually narrowed toward the proximal end of the curved part (111). Thus, waves can be gradually gathered together when passing through the curved part (111). The opening (113) is formed at the distal end of the curved part (111) of the airway (11), communicates with the front of the body (10), substantially faces upward and has a front edge (1131).

The longitudinal part (112) has a top end and a bottom end. The top end of the longitudinal part (112) may be gradually narrowed. Thus, air can be gradually gathered together when passing through the top end of the longitudinal part (112) of the airway (11) to form a strong airflow. The bottom end of the longitudinal part (112) communicates with the proximal end of the curved part (111) of the airway (11). Because the opening (113) of the curved part (111) of the airway (11) faces upward, crests of waves can directly arrive at the opening (113) with minimized loss of kinetic energy and then pass into the airway (11) to effectively push air in the longitudinal part (112) upward (as shown in FIG. 4). Additionally, waves are gradually gathered when passing through the curved part (111) of the airway (11) to form an enhanced water column to push air in the longitudinal part (112) more effectively.

With further reference to FIGS. 1, 2 and 4, the overhang (12) is formed on the top of the body (10), hangs over the airway (11) between the side walls of the airway (11) and has a top, a bottom, two sides, a pendent shelter (121), an air window (122) and a sunken spill flat (123). The pendent shelter (121) is formed on and protrudes down from the bottom of the overhang (12), hangs between the proximal and distal ends of the curved part (111) of the airway (11) and may have a curved bottom surface. The pendent shelter (121) forms a partition between the proximal and distal ends of the curved part (111) to prevent waves from directly pouring into the proximal end of the curved part (111) and longitudinal part (112) of the airway (11). The bottom surface of the pendent shelter (121) can smoothly contact with the waves pouring into the airway (11) to reduce loss of kinetic energy of the waves.

The air window (122) is formed in the overhang (12) and communicates with outside and the top end of the longitudinal part (112) of the airway (11) so that air in the airway (11) can pass to outside through the air window (122).

The sunken spill flat (123) is formed in the top of the overhang (12) and may be below the air window (122) in the overhang (12). Thus, waves spilling over the overhang (12) can falls on the spill flat (123) and flowing back to the sea along the spill flat (123).

With further reference to FIGS. 1 and 2, the partition panels (13) are mounted in the airway (11) at intervals to divide the airway (11) into multiple juxtaposed minor airways. Thus, waves are guided by the minor airways to smoothly rise up and fall down in the airway (11) to avoid turbulent flows. Each partition panel (13) has an outer edge. The outer edge of each panel may be formed integrally with the overhang (12) to enhance a structural strength of the partition panel (13).

The guide surface (14) is streamline, is formed on the front of the body (10) between the front edge (1131) of the opening (113) of the airway (11) and the bottom of the body (10) to reduce friction between the front of the body (10) and the waves and to guide waves to smoothly pour into the airway (11).

The spillways (114) are formed in the top of the body (10) below the sunken spill flat (123), are respectively adjacent to the two sides of the overhang (12) and communicates with the rear of the body (10). Thus, waves spill over the overhang (12) and seawater on the sunken spill flat (123) can flow to the rear of the body (10) through the spillway (114) to flow back to the sea.

The connecting recess (115) is formed longitudinally in one of the sides of the body (10). The connecting protrusion (116) is formed longitudinally on and protrudes from the other side of the body (10) and corresponds to the connecting recess (115). Thus, multiple wave-dissipating blocks can be connected together by mounting the connecting protrusion (116) of one wave-dissipating block into the connecting recess (115) of an adjacent one to form a firm breakwater. Additionally, multiple wave-dissipating blocks can be connected to enclose a fish farm for aqua-culture.

Figure 5:
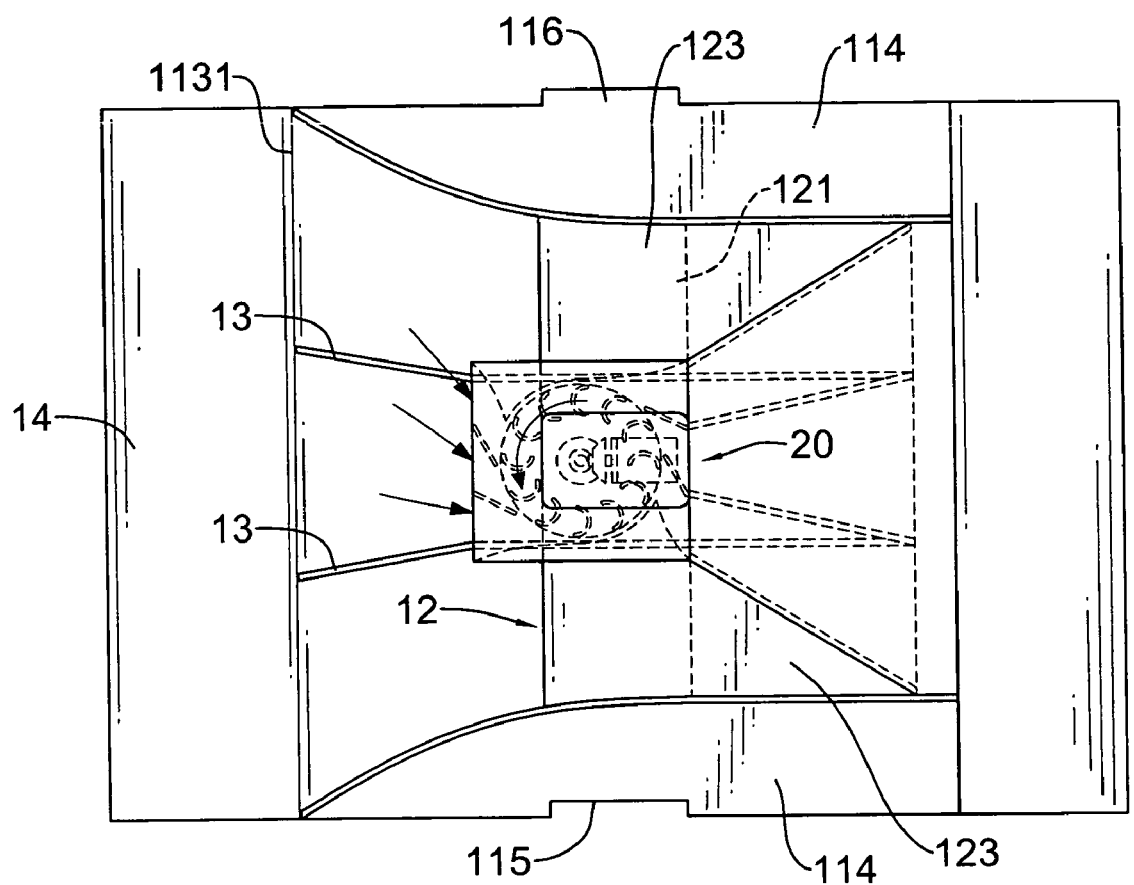
FIG. 5 is an operational top view of the wave-dissipating block in FIG. 1 with air being sucked to rotate the turbine fan.
Figure 6:
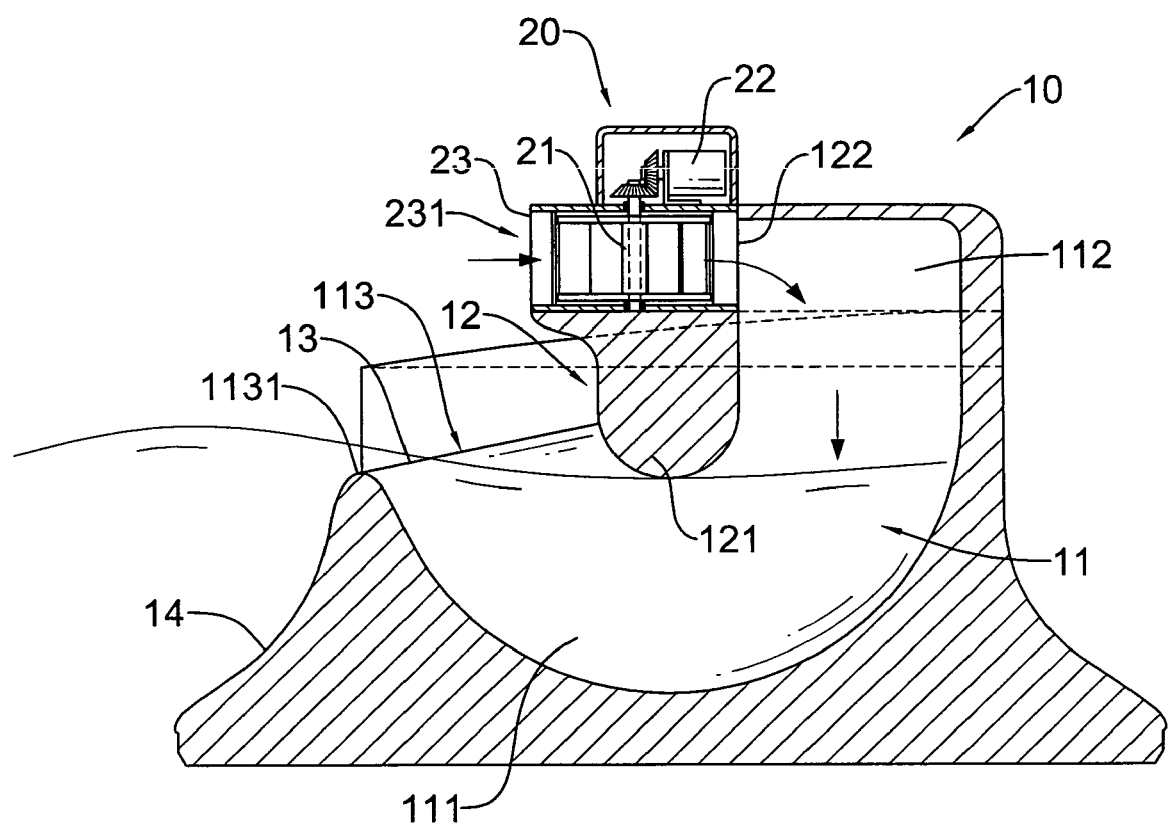
FIG. 6 is an operation side viewed in partial section of the wave-dissipating block in FIG. 1 with air being sucked into the airway.

With further reference to FIGS. 1, 2 and 4, the turbine generator assembly (20) is mounted on the overhang (12) and has a housing (23), a turbine fan (21) and a generator (22). The housing (23) is mounted on the overhang (12), has an air channel (231) and multiple guide panels (232) and may be mounted on the sunken spill flat (123). The air channel (231) is formed through the housing (23), communicates with the air window (122) in the overhang (12) and has an inlet and an outlet. With further reference to FIGS. 3 and 4, such that air in the airway (11) is pushed to pass through the air channel (231) when waves rise up in the airway (11). With further reference to FIGS. 5 and 6, when waves fall down in the airway, air outside the housing (23) is sucked into the airway (11) through the air channel (231) in the housing (23).

Figure 7:
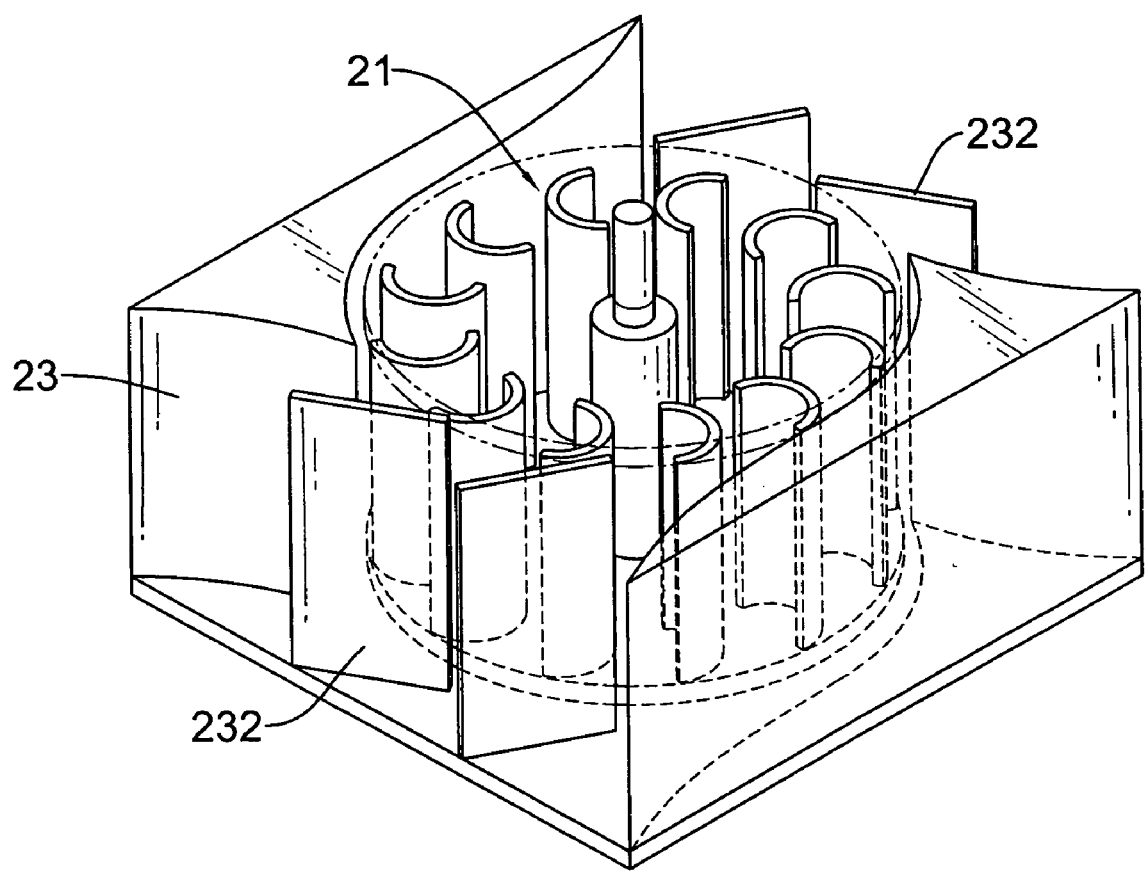
FIG. 7 is an enlarged perspective view of the turbine fan.
Figure 8:
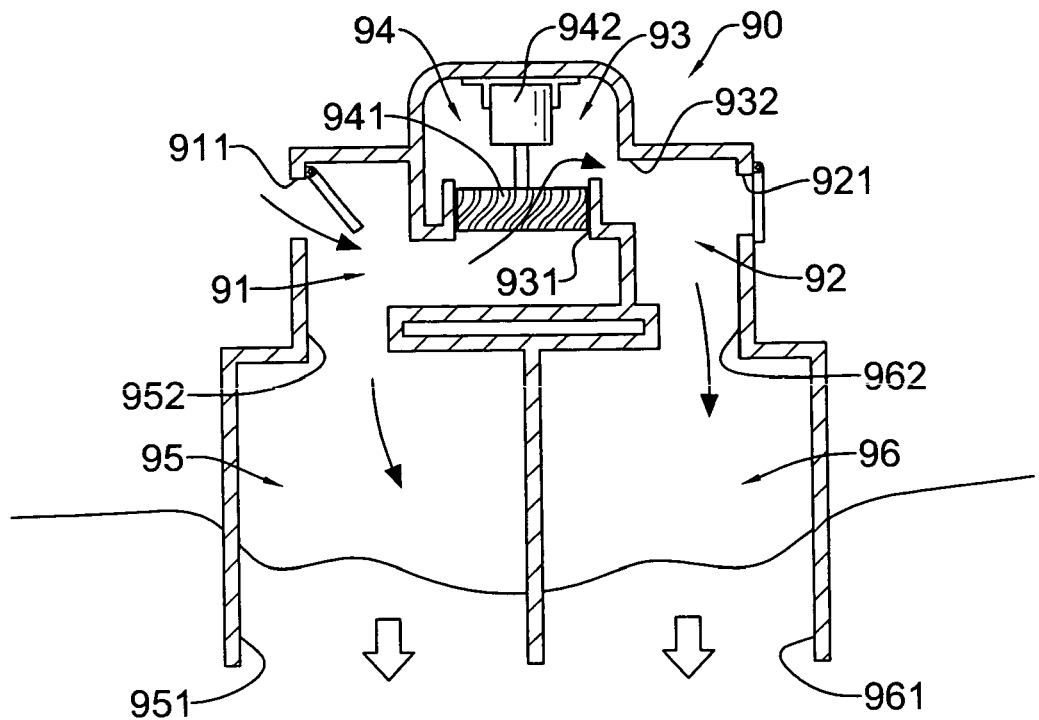
FIG. 8 is an operational side view in partial section of a first conventional apparatus that utilizes waves for generating electric power showing waves in an air chamber of the apparatus rising up.
Figure 9:
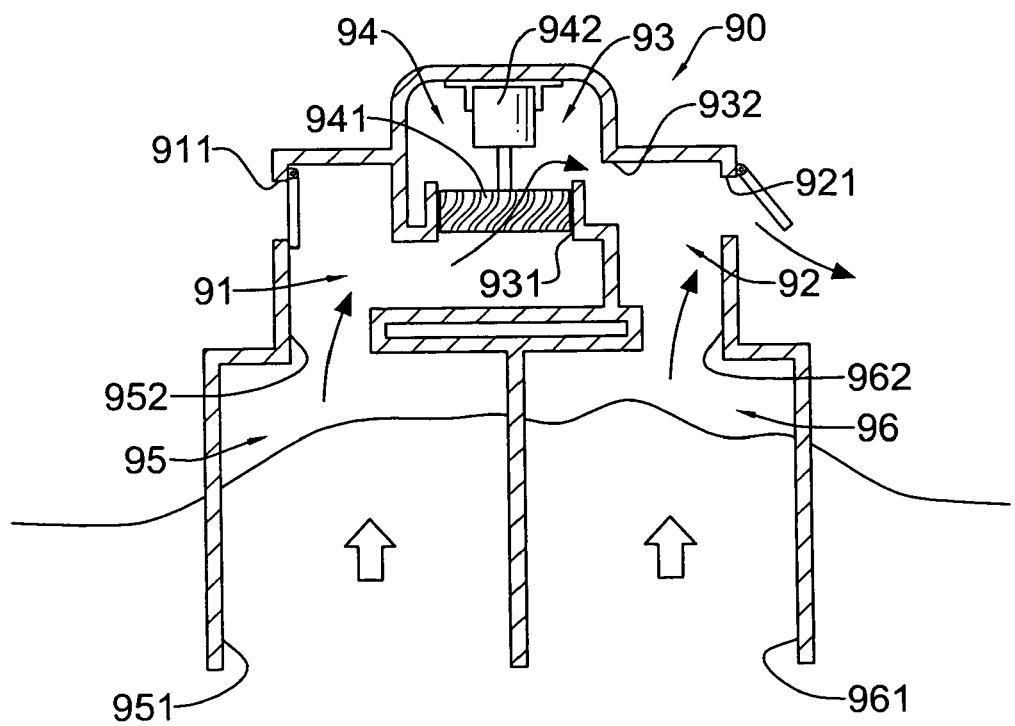
FIG. 9 is an operational side view in partial section of the apparatus in FIG. 8 showing waves in the air chamber of the apparatus falling down.
Figure 10:
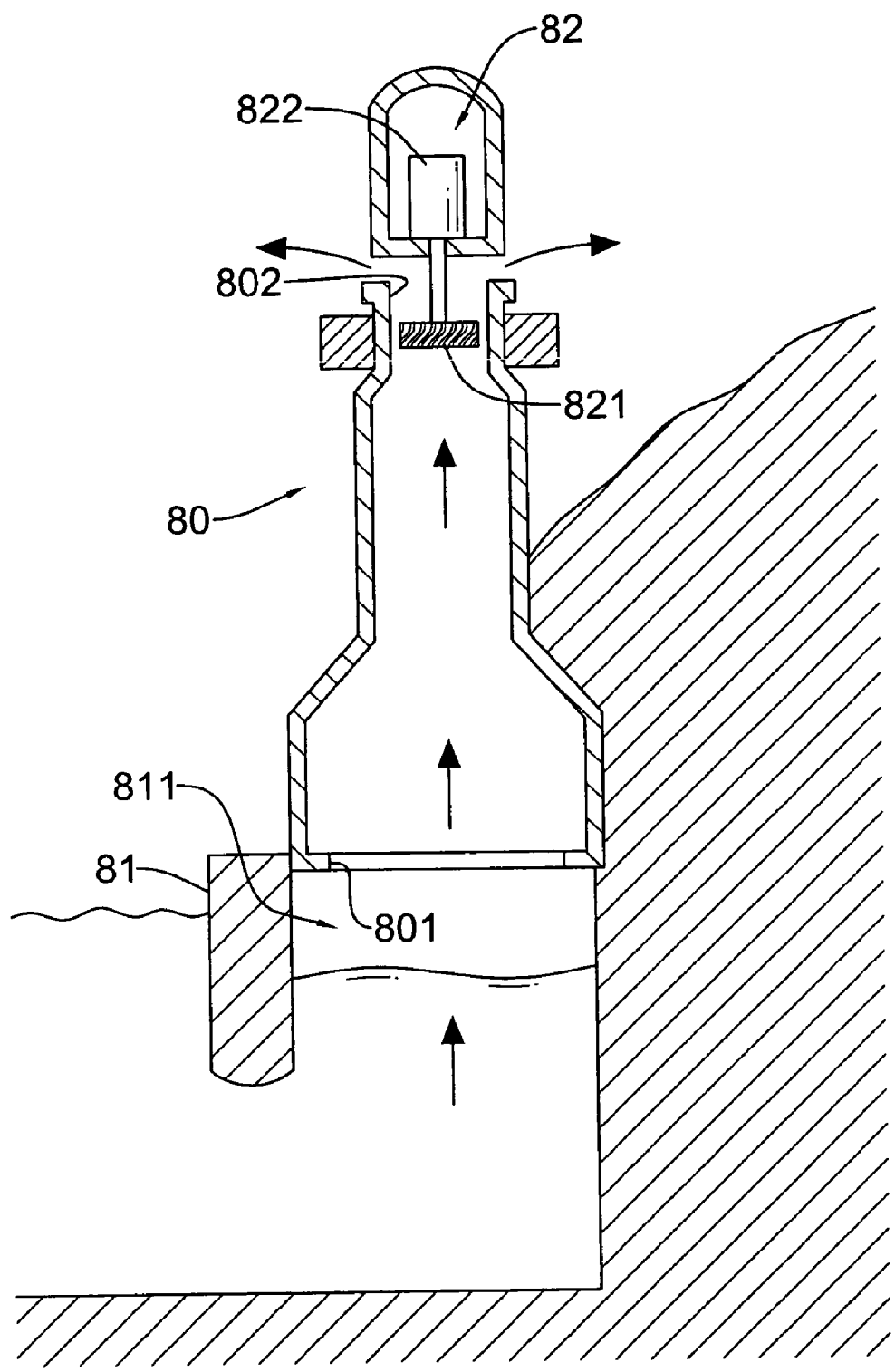
FIG. 10 is an operational side view in partial section of a second conventional apparatus that utilizes waves for generating electric power.
Figure 11:
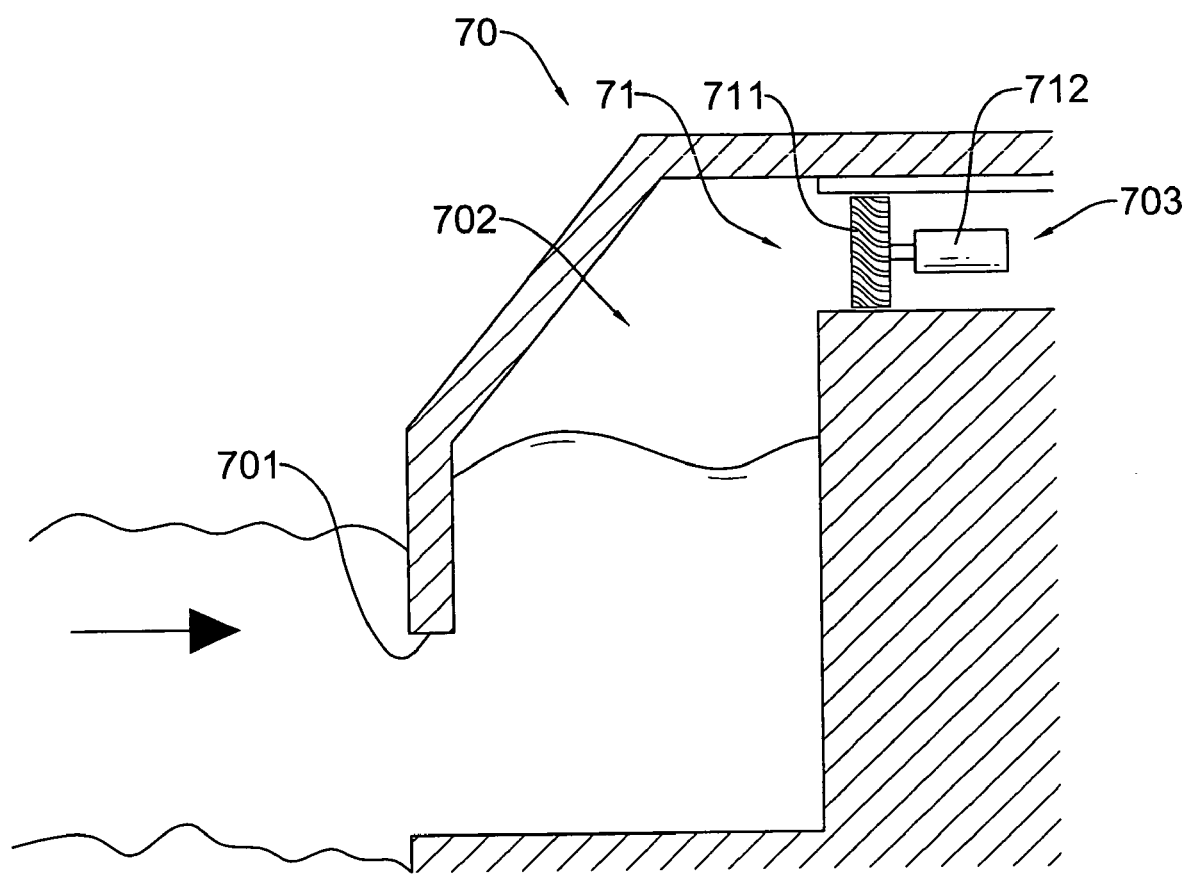
FIG. 11 is an operational side view in partial section of a third conventional apparatus that utilizes waves for generating electric power.

With further reference to FIG. 7, the guide panels (232) are respectively mounted in the inlet and outlet of the air channel (231) in the housing (23) and each guide panel (232) has an inner surface imaginatively extending to contact tangentially with an imaginary circle. Thus, air can be guided into the housing (23) no matter from the inlet or outlet and forms a unidirectional cyclone.

The turbine fan (21) is mounted rotatably in air channel (231) in the housing (23) to be rotated by air passing through the air channel (231). Especially, blades of the turbine fan (21) are capable of perpendicularly contacting with the cyclone formed in the housing (23) so that the turbine fan (21) can be more efficiently pushed by the cyclone to rotate unidirectionally.

The generator (22) is mounted in the housing (23) and is connected to and driven by the turbine fan (21) to convert kinetic energy into electric power.

As wave crests and wave troughs consecutively arrive in the opening (113) of the airway (11) with minimized loss of kinetic energy, water column in the airway (11) repeatedly rise and fall to form an enough drop height and air is also repeatedly sucked into or pushed out of the airway (11) through the air channel (231). Thus, the generator (22) can be effectively driven by the turbine fan (21) to efficiently generate electric power at all times.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wave-dissipating block comprising
  a body having
    a front;
    a rear;
    a top;
    a bottom;
    two sides;
    an airway formed in the body, being substantially
      J-shape and having
      two side walls;
      a curved part having
        a proximal end;
        a distal end; and
        an opening formed at the distal end of the curved
          part of the airway, communicating with the front
          of the body, substantially facing upward and
          having a front edge; and
      a longitudinal part having a top end; and a bottom end communicating with the proximal end of the curved part of the airway; and an overhang formed on the top of the body, hanging over the airway between the side walls of the airway and having a top;

a bottom;

two sides;

a pendent shelter formed on and protruding down from the bottom of the overhang, hanging between the proximal and distal ends of the curved part of the airway; and an air window formed in the overhang and communicating with outside and the top end of the longitudinal part of the airway; and a turbine generator assembly mounted on the overhang and having a housing mounted on the overhang and having an air channel formed through the housing, communicating with the air window in the overhang and having an inlet and an outlet,;

a turbine fan mounted rotatably in air channel in the housing; and a generator connected to and driven by the turbine fan.

2. The wave-dissipating block as claimed in claim 1, wherein the body further has multiple partition panels mounted in the airway at intervals to divide the airway into multiple juxtaposed minor airways.

3. The wave-dissipating block as claimed in claim 1, wherein the body further has a guide surface being streamline, formed on the front of the body between the front edge of the opening of the airway and the bottom of the body.

4. The wave-dissipating block as claimed in claim 1, wherein the overhang further has a sunken spill flat formed in the top of the overhang below the air window in the overhang;

the body further has two spillways formed in the top of the body below the sunken spill flat, being respectively adjacent to the two sides of the overhang and communicating with the rear of the body; and the housing is mounted on the sunken spill flat.

5. The wave-dissipating block as claimed in claim 1, wherein the body further has a connecting recess formed longitudinally in one of the sides of the body; and a connecting protrusion formed longitudinally on and protruding from the other side of the body and corresponding to the connecting recess.

6. The wave-dissipating block as claimed in claim 1, wherein the curved part of the airway is gradually narrowed toward the proximal end of the curved part.

7. The wave-dissipating block as claimed in claim 6, wherein the top end of the longitudinal part of the airway is gradually narrowed.

8. The wave-dissipating block as claimed in claim 1, wherein the pendent shelter of the overhang further has a curved bottom surface.

9. The wave-dissipating block as claimed in claim 1, wherein the housing further has multiple guide panels respectively mounted in the inlet and outlet of the air channel in the housing.

10. The wave-dissipating block as claimed in claim 2, wherein each partition panel has an outer edge formed integrally with the overhang.

* * * * *